United States Patent [19]
Pipet

[11] Patent Number: 5,988,873
[45] Date of Patent: Nov. 23, 1999

[54] PORTABLE BATHYMETRIC PROBE SIMULATOR

[75] Inventor: Alain Pipet, Melgven, France

[73] Assignee: Etat Francais, Arcueil Cedex, France

[21] Appl. No.: 08/977,804

[22] Filed: Nov. 25, 1997

[30] Foreign Application Priority Data

Nov. 28, 1996 [FR] France ................................ 96.14573

[51] Int. Cl.⁶ .......................... G01K 15/00; G01R 35/00; G01S 15/00
[52] U.S. Cl. ............................. 374/1; 73/170.29; 73/300; 73/597; 73/866.4; 324/601; 367/89
[58] Field of Search ................... 324/158.1, 601, 324/713; 374/1, 134, 142; 73/866.4, 300, 170.29, 597; 367/89, 95, 134; 310/334

[56] References Cited

U.S. PATENT DOCUMENTS

| | | | |
|---|---|---|---|
| 3,611,276 | 10/1971 | Massa | 374/134 |
| 4,041,382 | 8/1977 | Washburn | 374/134 |
| 4,293,916 | 10/1981 | Del Re et al. | 374/1 |
| 4,518,915 | 5/1985 | Danforth et al. | 374/134 |
| 4,545,689 | 10/1985 | Dunavin et al. | 374/1 |
| 4,854,728 | 8/1989 | Baron et al. | 374/1 |
| 5,483,190 | 1/1996 | McGiven | 374/1 |

FOREIGN PATENT DOCUMENTS 0 010 762   5/1980   European Pat. Off. .

*Primary Examiner*—Randy W. Gibson
*Attorney, Agent, or Firm*—Oliff & Berridge, PLC

[57] ABSTRACT

The invention relates to a portable simulator for bathymetric probes of the thermometric or calorimetric types connected at the output to an acquisition card. The simulator has at least four circuits corresponding, respectively, to the following four functions: a) selecting a probe type (thermometric or celerimetric) and establishing a firing sequence; b) generating a periodic signal of variable frequency to simulate a celerimetric type probe; c) generating a variation in temperature to simulate a thermometric probe; d) detecting a supply voltage threshold, with circuits b and c having a common section ending at the input of the acquisition card.

6 Claims, 1 Drawing Sheet

PORTABLE BATHYMETRIC PROBE SIMULATOR

BACKGROUND OF THE INVENTION

1. Field of Invention

The invention relates to a portable bathymetric probe simulator.

2. Description of Related Art

Sounding is one of the methods used aboard vessels of the French Navy for acquiring data from the aquatic environment. Various types of disposable probes are launched, connected by a thin cable to the ship or submarine. The probes deliver information that is collected on an electronic card located in a computer. These probes, built by the Sippican Company, for example, determine water temperature (XBT thermometric probes) or the rate of propagation of sound in water (XSV celerimetric probes).

The XBT probe includes a resistor whose value varies according to temperature. The XSV probe, which includes a generator, delivers a voltage whose frequency is inversely proportional to the speed of sound in water.

Probes are fired to predict the locations of and to detect submarines or surface vessels by measuring the speed of sound in water or by measuring the water temperature.

Probes are fired in two steps. In the first step, the probe is loaded into a launcher and a "probe loaded" contact signal is transmitted. In the second step, the probe detects the surface of the water. A "probe launched" contact signal is then transmitted, after which the probe begins to send information.

These disposable probes are relatively expensive and a large number of probes must often be launched in submarine combat exercises.

Probe simulators are extremely useful, avoiding unnecessary probe launchings as the system hardware or software can instantly be tested by the simulator. However, current probe simulators are large in size and allow only a single type of probe (XBT or XSV) to be simulated. Moreover, only truncated firing sequences can be simulated with these probes.

SUMMARY OF THE INVENTION

The goal of the invention is to provide a portable simulator to simulate the full probe-firing sequence as well as the reception of data from celerimetric or thermometric probes launched at sea by vessels of the French Navy that are equipped with sonar or by hydrographic survey ships.

The invention relates to a portable simulator for bathymetric probes of the thermometric or celerimetric type connected at the output to an acquisition card, characterized by having at least four circuits corresponding, respectively, to the following four functions:

a) selecting a probe type (thermometric or celerimetric) and establishing a firing sequence, b) generating a periodic signal of variable frequency to simulate a celerimetric type probe, c) generating a variation in temperature to simulate a thermometric probe, d) detecting a supply voltage threshold, with circuits b and c having a common section ending at the input of the acquisition card.

In a preferred embodiment, the circuit for selecting and establishing a probe-firing sequence has three switchable loops that have the following functions: probe type selection, probe loading, and surface detection by the probe.

The probe type selection loop has three levels. The first level powers circuits b and d, the second level grounds points in circuits b and c, and the third level connects to the input of an acquisition card.

The surface detection loop has two levels. The first level grounds points in circuits b and c and the second level connects to the input of the acquisition card.

In one embodiment, variable-frequency periodic signal generating circuit b has an integrated circuit operating as an astable multivibrator.

Preferably, temperature variation circuit c contains at least one variable resistor.

The portable simulator according to the invention allows simulation of a complete firing sequence of an actual probe: loading a probe into the launcher and then launching the probe.

The portable simulator according to the invention is easily connected and allows the complete range of possible thermometric or speed acquisition values to be tested: between 1.5° and 36° C. for temperature simulation and between 1430 m/s and 1560 m/s for speed simulation.

The fact of being able to sweep the entire range of possible thermometric or speed acquisition values also allows curve reduction algorithms to be validated. Finally, a calibration position (1.52° C.) is provided for testing temperature probes to diagnose a grounding fault in the electrical circuit of the vessel.

Other characteristics and advantages of the present invention will emerge from reading the description below of a preferred embodiment, which is provided for illustration and not limitation.

BRIEF DESCRIPTION OF THE DRAWINGS

The invention is described in detail with reference to the following drawing wherein.

DETAILED DESCRIPTION OF PREFERRED EMBODIMENTS

Figure 1:
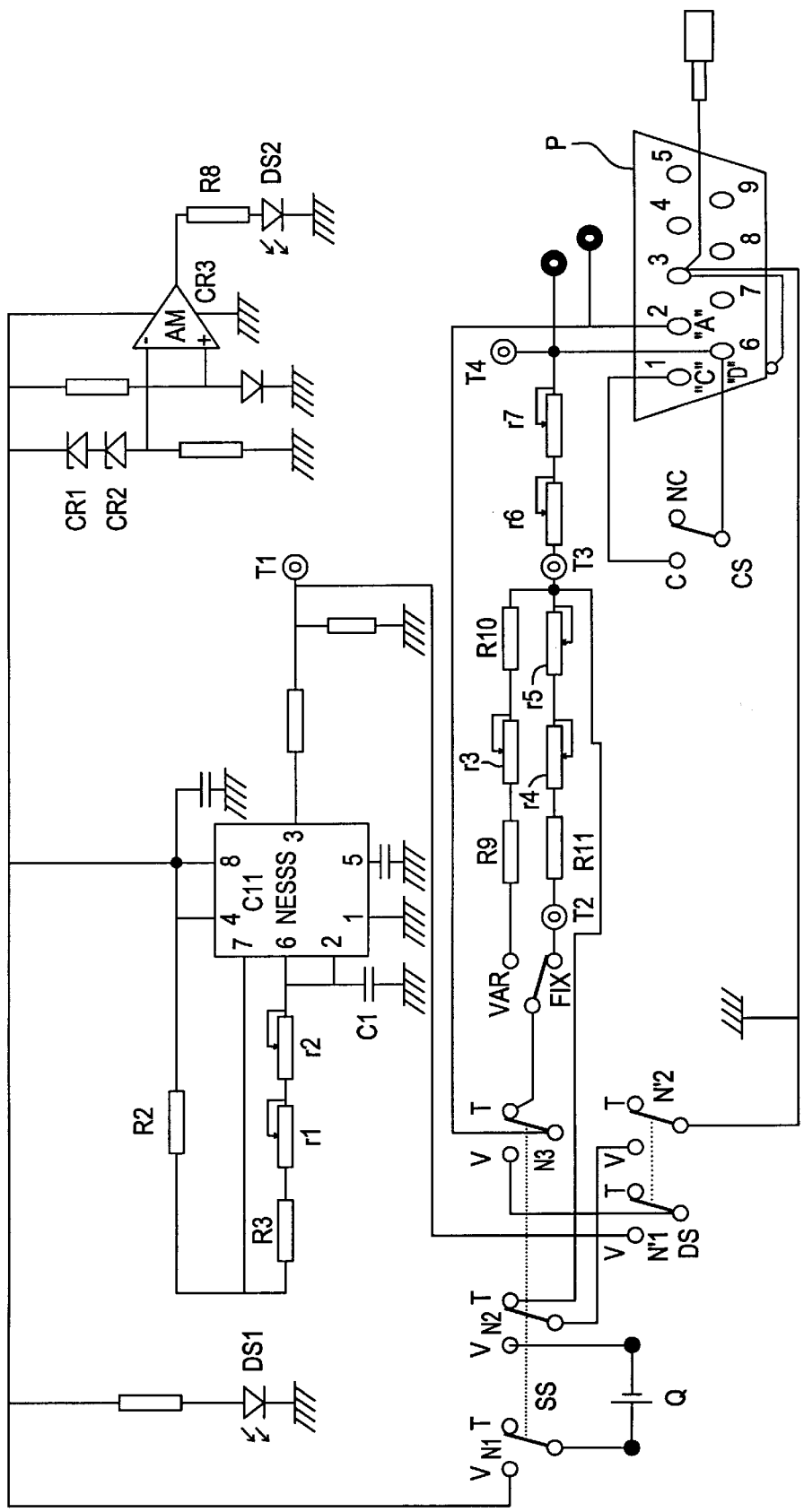
FIG. 1 represents the electrical schematic of the bathymetric probe simulator according to the invention.

Any firing sequence of a thermometric or celerimetric probe is preceded by two steps: probe loading and surface detection. Simulation includes these two steps.

The simulator has at least four circuits, which have the following functions:

a) selecting a probe type (thermometric or celerimetric) and establishing a firing sequence, b) generating a periodic signal of variable frequency to simulate a celerimetric type probe, c) generating a variation in temperature to simulate a thermometric probe, d) detecting a supply voltage threshold.

The probe type selection and sequence-establishing circuit has three switchable loops, "SS," "CS," and "DS," which have the following three functions, respectively: probe type selection, probe loading, and surface detection by the probe.

The switchable loop SS has three levels and two positions (V, T), with position V corresponding to simulation of an XSV type probe and position T to simulation of an XBT type probe.

A first level N1 of the switchable loop SS allows the frequency generation and threshold detection circuits to be powered at +9 volts from a battery Q.

A second level N2 of the switchable loop SS, in position V, allows the negative potential of the battery Q to be applied to the input of surface detection switchable loop DS. Position T allows a test point T3 to be grounded.

A third level N3 of the switchable loop SS allows recovery of data arriving at a point "A". The point "A" corresponds to pin 2 of a type DB9 connector P. These data can be interpreted by an analog acquisition card of the Sippican MK12 type.

Once the probe has been selected, a firing sequence must be established. Two steps are necessary: first, simulating probe presence, and second, detecting the surface.

A probe loading switchable loop CS allows probe loading to be simulated. The probe loading switchable loop CS has two positions (C for loaded, NC for not loaded). Before firing begins, the probe loading switchable loop CS is in position NC.

The presence of a probe is simulated by position C on the probe loading switchable loop CS, which is translated electrically by a contact between a point "C" corresponding to pin 1 of connector P and a point "B" corresponding to pin 6 of the connector P.

Surface detection is simulated by operating a surface detection switchable loop DS, which has two levels.

The operation of the switchable loop DS in a first level N'1 is as follows. When an XSV type probe arrives at the surface of the water, the XSV probe begins delivering an alternating voltage. The negative pole of the battery is at a potential of zero volts. Electrically, for simulation of the XSV probe, point "A" is subjected to an alternating voltage. A test point T1 is grounded. That is, in the celerimetric mode, point A is subjected to an alternative voltage because it is connected to point T1, which corresponds to the output of an oscillator, and because the switches are switched to the levels N1, N2, N'1 and N'2. The surface detection circuit is effected by sending an alternating voltage between point A and ground.

For simulating an XBT probe, the point "A" is switched to the resistance variation circuit. The point T3, defined above, is at ground, which corresponds to pin 3 of connector P. Data acquisition can now begin.

For both types of probes (i.e., XBT and XSV), the surface detection loop allows elements in the circuit to be grounded.

A second level N'2 of the surface detection switchable loop DS is used only to connect the output of the frequency generator at point "A" on the analog acquisition card input for speed acquisition.

The temperature probe simulator according to the invention can be switched from a fixed mode to a variable mode or vice versa by operating a two-position switch FV, the two positions shown in FIG. 1 being "fix" for the fixed mode and "var" for the variable mode.

The fixed-mode circuit simulates a calibration temperature of 1.52° C. The fixed mode circuit includes a fixed resistor R11 (10 kohms) and two variable precision resistors or potentiometers P4 and P5 (20 Ohms/25 turns) in series with the fixed resistor R11.

The variable-mode circuit detects temperatures between 1.5° and 36° C. The variable-mode circuit includes two fixed resistors R9 and R10 with the same value (10 kohms) and a precision variable resistor P3 (10 kohms/10 turns) in series with the two fixed resistors R9 and R10. The fixed-mode and variable-mode circuits are connected to point "B" on the connector P through two test points T3 and T4. The test points T3 and T4 are connected together by two precision variable resistors wired in series, P6 (10 kohms/25 turns) and P7 (20 ohms/25 turns).

The variable resistance values are adjusted to obtain a resistance of 15115 kohms ±0.01% between the two test points T2 and T3. To obtain this adjustment, the probe selector switchable loop SS is set to V. Fine adjustment is made with potentiometer P5. Resistors P6 and P7 must then be adjusted to obtain a resistance of 10 kohms ±0.01% between test points T3 and T4.

To simulate speed, a variable-frequency periodic signal between 212 and 227 Hz, imitating the presence of a submarine or surface vessel, is generated by an NE 555 integrated circuit operating as an astable multivibrator.

A 100 nF capacitor C1 is charged through a resistor R2 (220 ohms) and through a series circuit that includes one fixed resistor R3 (20 kohms) and two variable resistors P1 (2 kohms/10 turns) and P2 (10 kohms/25 turns). The signal period is $T=\log(\frac{1}{3})*(R2+R3+P1+P2)*C1$.

The center frequency is obtained by adjusting the variable resistor P2. The user can modify the frequency by turning on helipot P1. With the aforesaid values, a periodic signal lasting 4.54 milliseconds can be transmitted at the output. The center frequency of 220 Hz is regulated by measuring the signal with the aid of an oscilloscope or frequency meter (not shown) connected between the test point T1 and ground. A voltage divider point decreases the difference in potential at 50 mV peak to peak in order not to risk damaging the acquisition card, and so that the range of values recommended by the acquisition card manufacturer is maintained.

The values of variable resistors P1 and P2 are adjusted so as to obtain, at the integrated circuit output, a signal with a frequency of 220 Hz. For this purpose, the operator displays the output signal on an oscilloscope to measure a peak lasting 4.545 millisecond.

The threshold detection circuit shows whether the battery Q is drained. The threshold detection circuit has an amplifier AM wired as a comparator. The positive input of the comparator is connected to an in-line diode CR3 so that the comparator's potential is fixed at the threshold voltage of the in-line diode CR3. The negative input of the comparator is connected to zener diodes CR1 and CR2 ensuring a potential equal to the supply voltage less the reverse voltage of the zener diodes CR1 and CR2. If the voltage at the negative input is less than that arriving at the positive input, the comparator switches over.

The voltage at the terminals of a resistor R8 is equal to the supply voltage minus the two opposite voltages of the zener diodes CR1 and CR2.

As soon as the supply voltage becomes small, the zener diodes CR1 and CR2 cease to conduct. The voltage at the input is then approximately 0 and hence less than the threshold voltage of the diode CR3. Then the comparator switches over.

The reverse voltages of the diodes CR1 and CR2 are 4.7 V and 3.6 V, respectively. The threshold voltage of the diode CR3 is 0.6 V.

If the supply voltage is 9 V, the voltage at the terminals of the resistor R8 (supply voltage minus two reverse voltages) is 0.7 V. The comparator does not switch over, and a diode DS1 conducts.

If the supply voltage is less than or equal to 8.9 V, the voltage at the terminals of the resistor R8 is less than or equal to 0.6 V; the comparator flips and a diode DS2 1conducts.

The output of the probe simulator according to the invention is connected to the analog acquisition card, either directly through a cable that fits the DB9 connector P, or through a probe launcher unit already installed aboard a submarine, using a special flat cable.

What is claimed is:

1. A portable simulator for thermometric or celerimetric bathymetric probes, the simulator connected at an output to an acquisition card, comprising:
   a first circuit for selecting either the thermometric or celerimetric probe and establishing a firing sequence;
   a second circuit for generating a periodic signal of variable frequency to simulate the celerimetric probe;
   a third circuit for generating a variation in temperature to simulate the thermometric probe; and
   a fourth circuit for detecting a supply voltage threshold, wherein the second and the third circuits have a common section ending at an input of the acquisition card.

2. The portable simulator according to claim 1, wherein the first circuit comprises:
   a first loop for selecting the probe type;
   a second loop for selecting one of a loaded probe and a not loaded probe; and
   a third loop for simulating detection of the surface.

3. The portable simulator according to claim 2, wherein the first loop comprises:
   a first level for providing power to the second and the fourth circuits;
   a second level that grounds points in the second and the third circuits; and
   a third level connected to the input of the acquisition card.

4. The portable simulator according to claim 2, wherein the third loop comprises:
   a first level that grounds points in the second and the third circuits; and
   a second level that that connects to the input of the acquisition card.

5. The portable simulator according to claim 1, wherein the second circuit includes an integrated circuit operating as an astable multivibrator.

6. The portable simulator according to claim 1, wherein the third circuit contains at least one precision variable resistor.

* * * * *